United States Patent
Gu et al.

(10) Patent No.: US 11,489,759 B2
(45) Date of Patent: Nov. 1, 2022

(54) METHOD FOR DETERMINING ROUTE FLAPPING INFORMATION AND RELATED DEVICE

(71) Applicant: HUAWEI TECHNOLOGIES CO., LTD., Guangdong (CN)

(72) Inventors: Yunan Gu, Beijing (CN); Shunwan Zhuang, Beijing (CN); Gang Yan, Beijing (CN); Zhenbin Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/205,167

(22) Filed: Mar. 18, 2021

(65) Prior Publication Data
US 2021/0203591 A1 Jul. 1, 2021

Related U.S. Application Data

(63) Continuation of application No. PCT/CN2019/106068, filed on Sep. 17, 2019.

(30) Foreign Application Priority Data

Sep. 19, 2018 (CN) .......................... 201811094966.0

(51) Int. Cl.
*H04L 12/733* (2013.01)
*H04L 12/717* (2013.01)
(Continued)

(52) U.S. Cl.
CPC ........ *H04L 45/126* (2013.01); *H04L 43/0817* (2013.01); *H04L 45/123* (2013.01); *H04L 45/42* (2013.01)

(58) Field of Classification Search
CPC . H04L 45/126; H04L 43/0817; H04L 45/123; H04L 45/42
See application file for complete search history.

(56) References Cited

U.S. PATENT DOCUMENTS 7,111,206 B1 * 9/2006 Shafer ................ H04L 41/0266
714/20
7,668,082 B1 2/2010 Callon
(Continued)

FOREIGN PATENT DOCUMENTS

CN 101170457 A 4/2008
CN 101404614 A 4/2009
(Continued)

OTHER PUBLICATIONS

F. Wei et al.,"Purge Originator Identification TLV for IS-IS",Request for Comments: 6232,Internet Engineering Task Force (IETF),May 2011,total 6 pages.
(Continued)

*Primary Examiner* — Abdulkader M Alriyashi

(57) ABSTRACT

Embodiments of this application provide a method for determining route flapping information, to determine route flapping information based on parameter information reported by a routing device. The method in the embodiments of this application includes the following steps: receiving parameter information sent by each of at least one routing device, where parameter information sent by any routing device includes at least one of protocol packet information, count information, and identity identification information of the any routing device; and determining route flapping information of a target routing device based on the parameter information sent by each of the at least one routing device, where the target routing device is one of the at least one routing device.

17 Claims, 10 Drawing Sheets

(51) Int. Cl.
*H04L 12/721* (2013.01)
*H04L 12/26* (2006.01)
*H04L 45/12* (2022.01)
*H04L 43/0817* (2022.01)
*H04L 45/42* (2022.01)

(56) References Cited

U.S. PATENT DOCUMENTS

| | | | | |
|---|---|---|---|---|
| 9,838,317 | B1 * | 12/2017 | Yadav | H04L 43/0829 |
| 2011/0149721 | A1 * | 6/2011 | Yang | H04L 41/0654 |
| | | | | 370/216 |
| 2012/0030523 | A1 * | 2/2012 | Li | H04L 41/0681 |
| | | | | 714/47.3 |
| 2012/0327776 | A1 | 12/2012 | Li et al. | |
| 2017/0078170 | A1 | 3/2017 | Vasseur et al. | |
| 2017/0126486 | A1 * | 5/2017 | Prieto | H04L 41/082 |
| 2018/0241649 | A1 * | 8/2018 | Mazzitelli | H04L 43/024 |
| 2019/0190814 | A1 * | 6/2019 | Tseng | H04L 45/28 |

FOREIGN PATENT DOCUMENTS

| | | | |
|---|---|---|---|
| CN | 101582847 | A | 11/2009 |
| CN | 102025642 | B * | 4/2011 |
| CN | 102035716 | A | 4/2011 |
| CN | 102594714 | A | 7/2012 |
| CN | 103200109 | A | 7/2013 |
| CN | 104539461 | A | 4/2015 |
| CN | 105553844 | A | 5/2016 |
| CN | 106059934 | A | 10/2016 |
| CN | 106169978 | A | 11/2016 |
| CN | 106470154 | A | 3/2017 |
| CN | 106549866 | A | 3/2017 |
| CN | 107124289 | A * | 9/2017 |
| CN | 108123848 | A | 6/2018 |
| CN | 108337101 | A | 7/2018 |
| JP | 2001306470 | A | 11/2001 |
| JP | 2009239645 | A | 10/2009 |
| WO | 2018107882 | A1 | 6/2018 |

OTHER PUBLICATIONS

Chinese Office Action dated Jan. 26, 2021 for Application No. 201811094966.0, 10 pages.
PCT Search Report for PCT/CN2019/106068 dated Sep. 17, 2019, 10 pages.
Yuka Kamizuru et al, Distributed Inter-AS Route Monitor—Distributed Internet Route Eye (DIRE), 1998, 8 pages.
Y. Gu et al, Network Monitoring Protocol. (NMP); draft-gu-network-monitoring-protocol.-00, Network Working Group, 17 pages.
European Patent Office extended European Search Report for Appln 19863087.3 dated Sep. 29, 2021, 19 pages.
Anna Mereu et al, Primary and backup paths optimal design for traffic engineering in hybrid IGP/MPLS networks, 2009, 8 pages.
Huang peng, Multiple Constrained Optimize Path Selection of Centralized Model, 2017, 2 pages (abstract).
Chinese Office Action for Application No. 201811094966.0 dated Mar. 31, 2022, 7 pages.

* cited by examiner

701 — A routing device sends parameter information to an information obtaining device

METHOD FOR DETERMINING ROUTE FLAPPING INFORMATION AND RELATED DEVICE

CROSS-REFERENCE TO RELATED APPLICATIONS

This application is a continuation of International Application No. PCT/CN2019/106068, filed on Sep. 17, 2019, which claims priority to Chinese Patent Application No. 201811094966.0, filed on Sep. 19, 2018. The disclosures of the aforementioned applications are hereby incorporated by reference in their entireties.

TECHNICAL FIELD

This application relates to the field of communications, and in particular, to a method for determining route flapping information and a related device.

BACKGROUND

An interior gateway protocol (IGP) is a protocol used to exchange routing information between a host and a routing device. The IGP includes open shortest path first (OSPF), intermediate system to intermediate system (IS-IS), and the like. In the IGP, route flapping often occurs. The route flapping is a phenomenon that a route repeatedly withdraws and recurs in a short period of time in a routing table. Scientists have been studying how to quickly locate a flapping source and determine a route flapping cause after the route flapping occurs.

When the route flapping cause is queried, a faulty area is located by checking of an entire network, and then performing area isolation for a plurality of times in order to narrow down a fault scope until a fault source is located. A user logs in to a faulty routing device through a management port, and checks parameters of the routing device to determine the flapping cause. It can be learned that a process of determining the flapping cause of the faulty routing device is time-consuming and inefficient.

SUMMARY

This application provides a method for determining route flapping information, used to determine route flapping information based on parameter information reported by a routing device.

A first aspect of this application provides a method for determining route flapping information, including:

An information obtaining device receives parameter information sent by each of at least one routing device. Parameter information sent by any routing device includes at least one of protocol packet information, count information, and identity identification information of the any routing device.

The protocol packet information may be sent in real time, the count information may be sent periodically, and the identity identification information may be sent when a connection is established between the information obtaining device and the routing device.

The information obtaining device analyzes the parameter information sent by each of the at least one routing device. In routing devices that send parameter information to the information obtaining device, some or all of the parameter information sent by the at least one routing device is parameter information of an abnormal parameter. A routing device corresponding to abnormal parameter information is a target routing device on which route flapping occurs. After determining the parameter information of the abnormal parameter, the information obtaining device determines route flapping information of the target routing device based on the parameter information of the abnormal parameter. The route flapping information includes a flapping source and a flapping cause. The information obtaining device may determine, based on parameter information reported by the target routing device, that the flapping source is the target routing device, a neighboring routing device of the target routing device, or a link between the target routing device and the neighboring routing device of the target routing device.

Embodiments of this application have the following advantage. In a process of monitoring the routing device, after receiving the parameter information sent by each of the at least one routing device, the information obtaining device determines the route flapping information of the target routing device based on the parameter information. In this embodiment, the information obtaining device may determine the route flapping information by receiving the parameter information sent by the at least one routing device without isolating the routing device and then logging in the routing device to view the route flapping information. This greatly improves efficiency of determining of route flapping information of a faulty routing device.

According to the first aspect, in a first possible implementation of the first aspect, that an information obtaining device receives parameter information sent by each of at least one routing device includes:

The routing device reports the parameter information to the information obtaining device after encapsulating the parameter information based on a predefined format corresponding to a network monitoring protocol. The information obtaining device receives, over the network monitoring protocol, the parameter information sent by each routing device. The network monitoring protocol may be used to monitor an IGP.

In this embodiment, a manner of reporting the parameter information is described, and feasibility of the solution increases.

According to the first aspect, in a second possible implementation of the first aspect, that an information obtaining device receives parameter information sent by each of at least one routing device includes:

The routing device reports the parameter information to the information obtaining device after encapsulating the parameter information based on a BMP format. The information obtaining device obtains, according to an extended BMP protocol, the parameter information sent by each routing device.

A BMP is a monitoring protocol of a border gateway protocol (BGP). The extended BMP indicates that a message type of an original BMP protocol is extended, and the routing device may report the parameter information to the information obtaining device with an extended BMP message.

In this embodiment, another manner of reporting the parameter information is described, and feasibility and flexibility of the solution increase.

According to the first aspect, in a third possible implementation of the first aspect, that an information obtaining device receives parameter information sent by each of at least one routing device includes:

After encapsulating the parameter information based on a format of a YANG model, the routing device reports the parameter information to the information obtaining device over a Netconf protocol or a gRPC protocol, and the information obtaining device receives the parameter information. The parameter information in this application may be encapsulated into one or more YANG models.

In this embodiment, another manner of reporting the parameter information is described, and feasibility and flexibility of the solution increase.

According to the first aspect and the first to the third possible implementations of the first aspect, in a fourth possible implementation of the first aspect, that the information obtaining device determines route flapping information includes:

When the identity identification information of at least two first routing devices is the same, route flapping is inevitably caused. In this case, the information obtaining device determines that the flapping cause is a conflict of the identity identification information of the routing devices, and determines that the flapping source is the at least two first routing devices. The at least one routing device includes the at least two first routing devices.

In this embodiment, a possible manner in which the information obtaining device determines the route flapping information is described. This improves the feasibility of the solution.

According to the first aspect and the first to the third possible implementations of the first aspect, in a fifth possible implementation of the first aspect, the count information includes a quantity of interface flipping times of the routing device.

The determining route flapping information includes:

When a quantity of interface flipping times that is reported by a second routing device in the at least one routing device is within a preset quantity range of times, because the preset quantity range of times is a range of a predetermined quantity of abnormality times, the information obtaining device determines that the flapping cause is that the quantity of interface flipping times of the routing device is abnormal. In addition, the flapping source is the second routing device.

In this embodiment, another possible manner in which the information obtaining device determines the route flapping information is described. This improves the feasibility and the flexibility of the solution.

According to the first aspect and the first to the third possible implementations of the first aspect, in a sixth possible implementation of the first aspect, the count information includes count data of received hello packets of the routing device.

The determining route flapping information based on the parameter information sent by each of the at least one routing device includes:

When count data of received hello packets of a third routing device is intermittently not increased, and count data, of the received hello packets, reported by the third routing device is less than a preset value, the information obtaining device determines that the flapping cause is neighbor flapping based on the count data, of the received hello packets, that is sent by the third routing device and that is less than the preset value. The at least one routing device includes the third routing device.

In addition, because abnormality of the count data of the received hello packets of the third routing device may be caused by a fault of the third routing device, or may be caused by a fault of a neighboring routing device of the third routing device, the flapping source may be a third circuit routing device, or may be the neighboring routing device of the third routing device.

In this embodiment, another possible manner in which the information obtaining device determines the route flapping information is described. This improves the feasibility and the flexibility of the solution.

According to the first aspect and the first to the third possible implementations of the first aspect, in a seventh possible implementation of the first aspect, the count information includes count data of link state packet LSP purge packets of the routing device.

The determining route flapping information based on the parameter information sent by each of the at least one routing device includes:

Count data of LSP purge packets initiated by a fourth routing device is abnormal. To be specific, within a preset data range, the information obtaining device determines, based on the count data of the LSP purge packets sent by the fourth routing device, that the flipping cause is that the LSP purge packets of the routing device are abnormal. Because abnormality of the count data of the LSP purge packets initiated by the fourth routing device may be caused by a fault of the fourth routing device, or may be caused by a fault of a neighboring routing device of the fourth routing device, the information obtaining device determines that the flapping source is the fourth routing device or the neighboring routing device of the fourth routing device.

In this embodiment, another possible manner in which the information obtaining device determines the route flapping information is described. This improves the feasibility and the flexibility of the solution.

According to the first aspect and the first to the third possible implementations of the first aspect, in an eighth possible implementation of the first aspect, that the information obtaining device determines route flapping information includes:

When cases described in the fourth aspect to the seventh aspect of the first aspect is not met, the information obtaining device determines an earliest abnormal parameter in the parameter information sent by each routing device of the at least one routing device. The parameter is a target parameter, and the information obtaining device determines that a routing device that reports the target parameter is the flipping source. The information obtaining device may further analyze an LSP packet sent by a routing device corresponding to the earliest abnormal parameter. If finding that values of a plurality of LSP seqnum fields in the packet continuously increase and a specific route is intermittent, the information obtaining device determines that the flapping cause is route source flapping caused by the intermittent route.

In this embodiment, another possible manner in which the information obtaining device determines the route flapping information is described. This improves the feasibility and the flexibility of the solution.

A second aspect of this application provides a method for determining route flapping information, including:

A routing device in a monitoring area sends parameter information to an information obtaining device. The parameter information sent by the routing device includes at least one of protocol packet information, count information, and identity identification information of the routing device. After obtaining the parameter information, the information obtaining device determines, from the parameter information, parameter information of an abnormal parameter, and then determines, based on the parameter information, route flapping information of the routing device that sends the parameter information.

In this embodiment, the route flapping information of the routing device is obtained based on abnormal parameter information. The obtained route flapping information includes a flapping source and a flapping cause. In a possible case, the routing device that sends the abnormal parameter information and that is in the route flapping information is the flapping source. In another possible case, after the routing device sends the abnormal parameter information to the information obtaining device, the information obtaining device learns, based on the parameter information, that the flipping source is a neighboring routing device of the routing device, or learns that the flipping source is a link between the routing device and the neighboring routing device of the routing device.

In this embodiment, the routing device can send the parameter information to the information obtaining device. Therefore, the information obtaining device determines the route flapping information based on the parameter information without isolating the routing device and then logging in the routing device in an isolation area to determine the route flapping information. This greatly improves efficiency of determining of route flapping information of a faulty routing device.

According to the second aspect, in a first possible implementation of the second aspect, that a routing device sends parameter information to an information obtaining device includes:

The routing device reports the parameter information to the information obtaining device after encapsulating the parameter information based on a predefined format corresponding to a network monitoring protocol. The information obtaining device receives, over the network monitoring protocol, the parameter information sent by each routing device. The network monitoring protocol may be used to monitor an IGP.

In this embodiment, a manner of reporting the parameter information is described, and feasibility of the solution increases.

According to the second aspect, in a second possible implementation of the second aspect, that a routing device sends parameter information to an information obtaining device includes:

The routing device reports the parameter information to the information obtaining device after encapsulating the parameter information based on a BMP format. The information obtaining device obtains, according to an extended BMP protocol, the parameter information sent by each routing device.

A BMP is a monitoring protocol of a BGP. The extended BMP indicates that a message type of an original BMP protocol is extended, and the routing device may report the parameter information to the information obtaining device with an extended BMP message.

In this embodiment, another manner of reporting the parameter information is described, and the feasibility and flexibility of the solution increase.

According to the second aspect, in a third possible implementation of the second aspect, that a routing device sends parameter information to an information obtaining device includes:

After encapsulating the parameter information based on a format of a YANG model, the routing device reports the parameter information to the information obtaining device over a Netconf protocol or a gRPC protocol, and the information obtaining device receives the parameter information. The parameter information in this application may be encapsulated into one or more YANG models.

In this embodiment, another manner of reporting the parameter information is described, and feasibility and flexibility of the solution increase.

A third aspect of this application provides an information obtaining device, including:

An information receiving unit is configured to receive parameter information sent by each of at least one routing device. Parameter information sent by any routing device includes at least one of protocol packet information, count information, and identity identification information of the any routing device.

An information determining unit is configured to determine route flapping information of a target routing device based on the parameter information sent by each of the at least one routing device. The target routing device is one of the at least one routing device.

In a process of monitoring the routing device, after receiving the parameter information sent by each of the at least one routing device, the information obtaining device determines the route flapping information of the target routing device based on the parameter information. In this embodiment, the information obtaining device may determine the route flapping information by receiving the parameter information sent by the at least one routing device without isolating the routing device and then logging in the routing device to view the route flapping information. This greatly improves efficiency of determining of route flapping information of a faulty routing device.

According to the third aspect, in a first possible implementation of the third aspect, the information receiving unit is specifically configured to receive, over a network monitoring protocol, the parameter information sent by each of the at least one routing device. The network monitoring protocol is a monitoring protocol of an IGP.

In this embodiment, a manner of reporting the parameter information is described, and feasibility of the solution increases.

According to the third aspect, in a second possible implementation of the third aspect, the information receiving unit is specifically configured to receive, over an extended monitoring protocol of a border gateway protocol BMP, the parameter information sent by each of the at least one routing device. The BMP protocol is a monitoring protocol of a BGP.

In this embodiment, another manner of reporting the parameter information is described, and feasibility and flexibility of the solution increase.

According to the third aspect, in a third possible implementation of the third aspect, the information receiving unit is specifically configured to receive, over a Netconf protocol or an open source remote procedure call gRPC protocol, a YANG model sent by each of the at least one routing device. The parameter information is encapsulated in the YANG model.

In this embodiment, another manner of reporting the parameter information is described, and feasibility and flexibility of the solution increase.

According to the third aspect and the first to the third possible implementations of the third aspect, in a fourth possible implementation of the third aspect, the information determining unit is specifically configured to: when the identity identification information of at least two first routing devices is the same, determine that a flapping cause is a conflict of the identity identification information of the routing devices, where the at least one routing device includes the at least two first routing devices; and determine that a flapping source is the at least two first routing devices.

In this embodiment, a possible manner in which the information obtaining device determines the route flapping information is described. This improves the feasibility of the solution.

According to the third aspect and the first to the third possible implementations of the third aspect, in a fifth possible implementation of the third aspect, the count information includes a quantity of interface flipping times of the routing device.

The information determining unit is specifically configured to: when a quantity of interface flipping times of a second routing device is within a preset quantity range of times, determine that a flapping cause is that the quantity of interface flipping times of the routing device is abnormal, where the at least one routing device includes the second routing device; and determine that a flapping source is the second routing device.

In this embodiment, another possible manner in which the information obtaining device determines the route flapping information is described. This improves the feasibility and the flexibility of the solution.

According to the third aspect and the first to the third possible implementations of the third aspect, in a sixth possible implementation of the third aspect, the count information includes count data of received hello packets of the routing device.

The information determining unit is specifically configured to: determine, based on count data, of hello packets, that is sent by a third routing device and that is less than a preset value, that a flapping cause is neighbor flapping, where the at least one routing device includes the third routing device; and determine that a flapping source is the third routing device, a neighboring routing device of the third routing device, or a link between the third routing device and the neighboring routing device of the third routing device.

In this embodiment, another possible manner in which the information obtaining device determines the route flapping information is described. This improves the feasibility and the flexibility of the solution.

According to the third aspect and the first to the third possible implementations of the third aspect, in a seventh possible implementation of the third aspect, the count information includes count data of link state packet LSP purge packets of the routing device.

The information determining unit is specifically configured to: determine, based on count data that is within a preset data range and that is of LSP purge packets sent by a fourth routing device, that a flapping cause is that the LSP purge packets of the routing device are abnormal, where the at least one routing device includes the fourth routing device; and determine that a flapping source is the fourth routing device or a neighboring routing device of the fourth routing device.

In this embodiment, another possible manner in which the information obtaining device determines the route flapping information is described. This improves the feasibility and the flexibility of the solution.

According to the third aspect and the first to the third possible implementations of the third aspect, in an eighth possible implementation of the third aspect, the information determining unit is specifically configured to: determine a target parameter in the parameter information sent by each of the at least one routing device, where the target parameter is an earliest abnormal parameter; and determine that a flapping source is a routing device corresponding to the target parameter.

In this embodiment, another possible manner in which the information obtaining device determines the route flapping information is described. This improves the feasibility and the flexibility of the solution.

A fourth aspect of this application provides a routing device, including:

A sending unit is configured to send parameter information to an information obtaining device. The parameter information sent by the routing device includes at least one of protocol packet information, count information, and identity identification information of the routing device, and the parameter information sent by the routing device is used by the information obtaining device to determine route flapping information of the routing device.

In this embodiment, the routing device can send the parameter information to the information obtaining device. Therefore, the information obtaining device determines the route flapping information based on the parameter information without isolating the routing device and then logging in the routing device in an isolation area to determine the route flapping information. This greatly improves efficiency of determining of route flapping information of a faulty routing device.

According to the fourth aspect, in a first possible implementation of the fourth aspect, the sending unit is specifically configured to send the parameter information to the information obtaining device over a network monitoring protocol. The network monitoring protocol is a monitoring protocol of an IGP.

In this embodiment, a manner of reporting the parameter information is described, and feasibility of the solution increases.

According to the fourth aspect, in a second possible implementation of the fourth aspect, the sending unit is specifically configured to send the parameter information to the information obtaining device over an extended monitoring protocol of a border gateway protocol BMP. The BMP protocol is a monitoring protocol of a BGP.

In this embodiment, another manner of reporting the parameter information is described, and feasibility and flexibility of the solution increase.

According to the fourth aspect, in a third possible implementation of the fourth aspect, the sending unit is specifically configured to send a YANG model to the information obtaining device over a Netconf protocol or an open source remote procedure call gRPC protocol. The parameter information is encapsulated in the YANG model.

In this embodiment, another manner of reporting the parameter information is described, and feasibility and flexibility of the solution increase.

A fifth aspect of this application provides an information obtaining device, including a memory, a transceiver, a processor, and a bus system.

The memory is configured to store a program and an instruction.

The transceiver is configured to receive or send information under control of the processor.

The processor is configured to execute the program in the memory.

The bus system is configured to connect the memory, the transceiver, and the processor, to enable the memory, the transceiver, and the processor to communicate with each other.

The processor is configured to invoke the program and the instruction in the memory to perform the method according to the first aspect.

A sixth aspect of this application provides a routing device, including a memory, a transceiver, a processor, and a bus system.

The memory is configured to store a program and an instruction.

The transceiver is configured to receive or send information under control of the processor.

The processor is configured to execute the program in the memory.

The bus system is configured to connect the memory, the transceiver, and the processor, to enable the memory, the transceiver, and the processor to communicate with each other.

The processor is configured to invoke the program and the instruction in the memory to perform the method according to the second aspect.

A seventh aspect of this application provides a computer apparatus. The computer apparatus includes a processor, and when the processor is configured to execute a computer program stored in a memory, the steps of the method according to the foregoing first aspect and the foregoing second aspect are implemented.

An eighth aspect of this application provides a computer-readable storage medium. The computer-readable storage medium stores a computer program, and when the computer program is executed by a processor, the steps of the method according to the foregoing first aspect and the foregoing second aspect are implemented.

BRIEF DESCRIPTION OF DRAWINGS

FIG. 5(*b*) is a format definition of a common header in a network monitoring protocol;

FIG. 6(*b*) is a schematic diagram of another embodiment of a method for determining route flapping information according to this application;

DESCRIPTION OF EMBODIMENTS

A routing device described in this application may be a router, may be a switch, or may be another device having a routing function. This is not specifically limited herein.

An information obtaining device related in this application may be a network management device, a network monitoring device, a third-party analysis device, or a controller, or may be another network device having a parameter information processing capability of a routing device. This is not specifically limited herein.

In the specification, claims, and accompanying drawings of this application, the terms "first", "second", "third", "fourth", and the like (if existent) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "have" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

Figure 1:
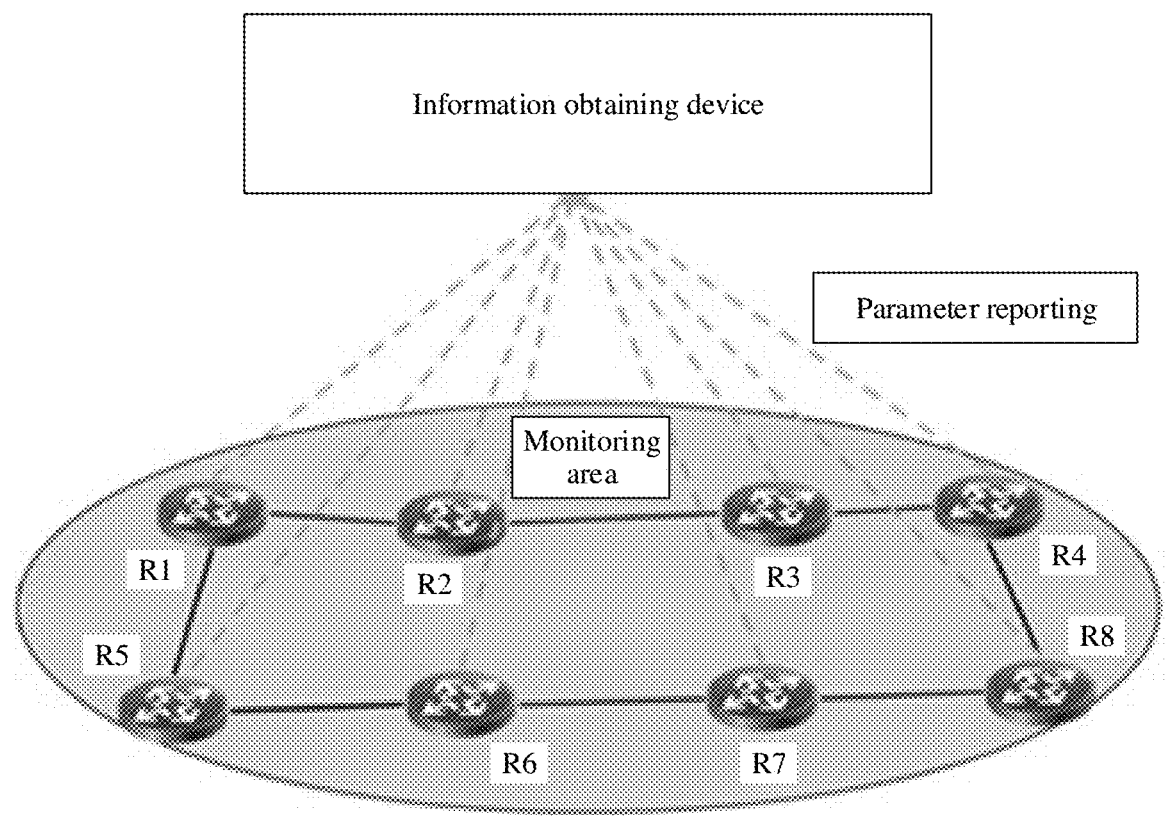
FIG. 1 is a schematic diagram of monitoring a routing device by an information obtaining device according to this application.

As shown in FIG. 1, the following describes a possible application scenario of this application.

An information obtaining device monitors routing devices in an IGP routing domain, namely, a monitoring domain. The routing devices R1 to R8 in the monitoring domain actively report parameter information of the routing devices R1 to R8 to the information obtaining device in real time or according to a specific rule. The reported parameter information usually includes at least one of three types of information: a system identifier (system ID) of the routing device, count information, and protocol packet information. When some information in the parameter information is abnormal, other information is also abnormal. For example, when count data of Hello packets in the count information is incorrect, interface flapping count of the routing device may be abnormal. After receiving the parameter information sent by the routing devices R1 to R8, the information obtaining device analyzes, in real time based on the received information, whether route flapping occurs on these routing devices. For example, the information obtaining device determines, based on count information reported by R2, that an interface flapping count of R2 is abnormal. Therefore, a flapping source is R2, and a flapping cause is that the interface flapping count is abnormal. Similarly, after receiving other parameter information, the information obtaining device also analyzes the parameter information. If the parameter information is found abnormal through analysis, route flapping information is determined based on corresponding abnormal parameter information, and it is unnecessary to log in to the routing devices one by one to view the route flapping information after the routing devices are isolated.

Figure 2:
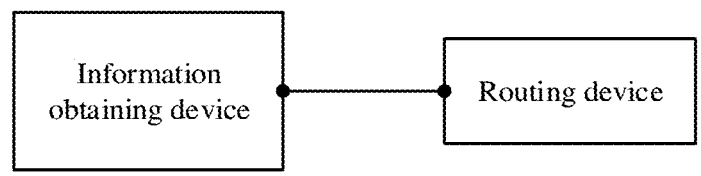
FIG. 2 is a schematic diagram of a connection between an information obtaining device and a routing device according to this application.

A method for determining route flapping information in this application is applied to an information obtaining device. As shown in FIG. 2, the information obtaining device is connected to a routing device. The routing device is configured to send parameter information of the routing device to the information obtaining device, and the information obtaining device may obtain route flapping information after analyzing and processing the parameter information sent by the routing device.

Figure 3:
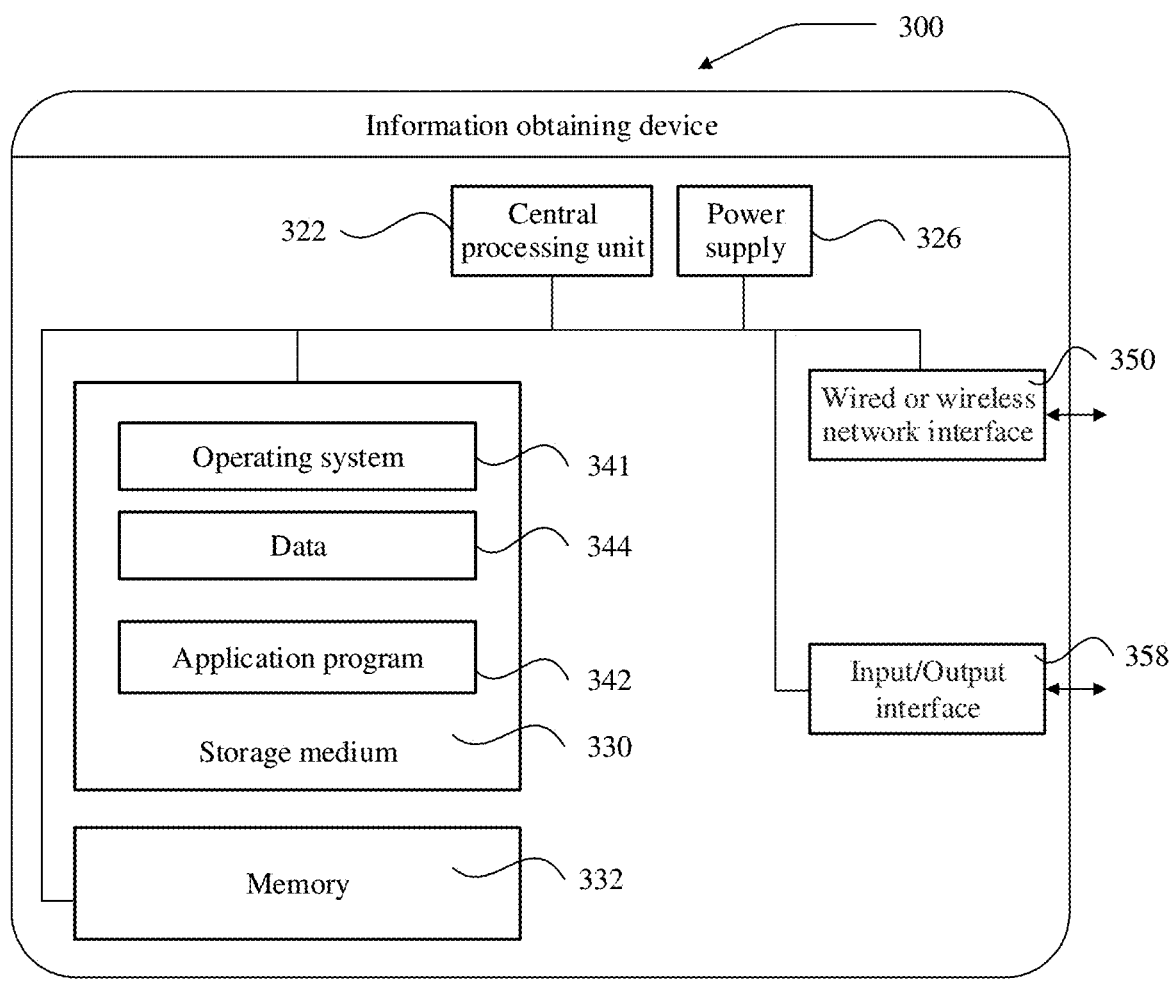
FIG. 3 shows a possible structure of an information obtaining device according to this application.

A possible structure of an information obtaining device in this application is shown in FIG. 3. The information obtaining device 300 may vary greatly with different configurations or performance, and may include one or more central processing units (CPUs) 322 (for example, one or more processors), a memory 332, and one or more storage media 330 storing an application program 342 or data 344 (for example, one or more mass storage devices). The memory 332 and the storage medium 330 may perform temporary storage or permanent storage. The program stored in the storage medium 330 may include one or more modules (not shown in the figure), and each module may include a series of instruction operations on the information obtaining device. Further, the central processing unit 322 may be configured to communicate with the storage medium 330, to perform, on the information obtaining device 300, the series of instruction operations in the storage medium 330.

The central processing unit 322 may perform the following steps based on the instruction operation:

receiving parameter information sent by each of at least one routing device, where parameter information sent by any routing device includes at least one of protocol packet information, count information, and identity identification information of the any routing device; and determining route flapping information of a target routing device based on the parameter information sent by each of the at least one routing device, where the target routing device is one of the at least one routing device.

The information obtaining device 300 may further include one or more power supplies 326, one or more wired or wireless network interfaces 350, one or more input/output interfaces 358, and/or one or more operating systems 341, such as Windows Server™, Mac OS X™, Unix™, Linux™, and FreeBSD™.

In example embodiments, the steps performed by the information obtaining device may be based on the structure of the information obtaining device shown in FIG. 3.

Figure 4:
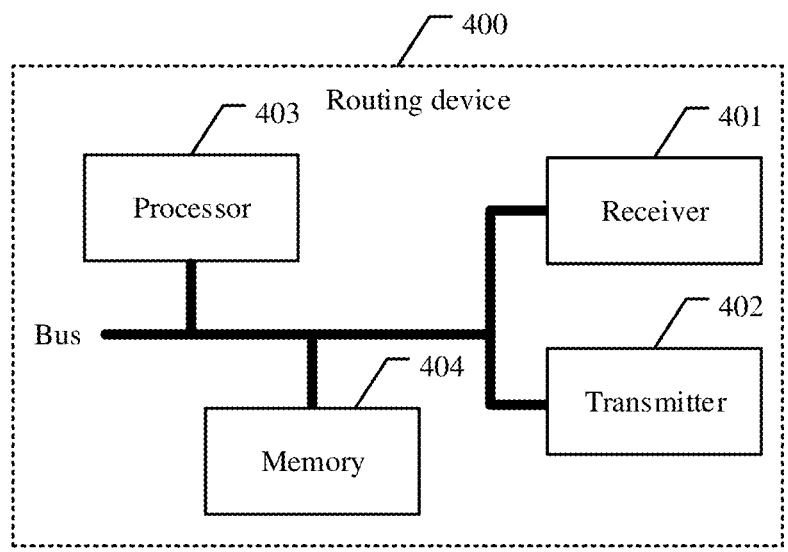
FIG. 4 shows a possible structure of a routing device according to this application.

For a routing device provided in an embodiment of this application, refer to FIG. 4. The routing device 400 includes:

a receiver 401, a transmitter 402, a processor 403, and a memory 404 (there may be one or more processors 403 in the routing device 400, and one processor is used as an example in FIG. 4). In some embodiments of this application, the receiver 401, the transmitter 402, the processor 403, and the memory 404 may be connected through a bus or in another manner, and an example in which the bus is used for connection is described in FIG. 4.

The memory 404 may include a read-only memory and a random access memory, and provide an instruction and data to the processor 403. A part of the memory 404 may further include a non-volatile random access memory (NVRAM). The memory 404 stores an operating system and an operation instruction, an executable module or a data structure, a subnet thereof, or an extended set thereof. The operation instruction may include various operation instructions to implement various operations. The operating system may include various system programs, to implement various basic services and process hardware-based tasks.

The processor 403 controls an operation of a network device, and the processor 403 may be further referred to as a central processing unit (CPU). In a specific application, components of the network device are coupled together through a bus system. In addition to a data bus, the bus system may further include a power bus, a control bus, a status signal bus, and the like. However, for clear description, various types of buses in the figure are referred to as the bus system.

The method disclosed in the foregoing embodiment of this application may be applied to the processor 403 or may be implemented by the processor 403. The processor 403 may be an integrated circuit chip and has a signal processing capability. In an implementation process, steps in the foregoing method can be completed through a hardware integrated logic circuit or an instruction in a form of software in the processor 403. The processor 403 may be a general purpose processor, a digital signal processor (DSP), an application-specific integrated circuit (ASIC), a field programmable gate array (FPGA) or another programmable logic device, a discrete gate or transistor logic device, or a discrete hardware component. The processor 403 may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished through a hardware decoding processor, or may be executed and accomplished through a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory 404, and the processor 403 reads information in the memory 404 and completes the steps in the foregoing method in combination with hardware of the processor 403.

The receiver 401 may be configured to: receive input digit or character information, and generate signal input related to a related setting and function control of the network device. The transmitter 402 may include a display device such as a display screen. The transmitter 402 may be configured to output digit or character information through an external interface.

In this embodiment of this application, the processor 403 is configured to perform a method for determining route flapping information in FIG. 5(a) to FIG. 8.

Figure 5A:
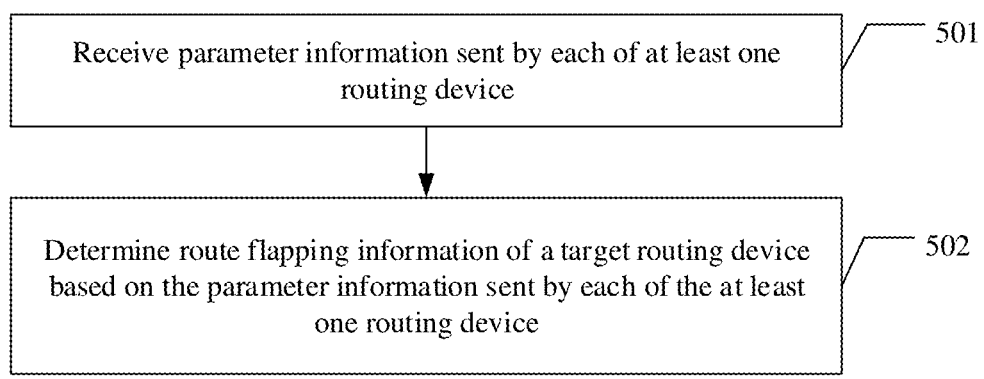
FIG. 5(*a*) is a schematic diagram of an embodiment of a method for determining route flapping information according to this application.

The foregoing describes example possible structures of the routing device and the information obtaining device in this application. Referring to FIG. 5(a), the following describes the method for determining route flapping information in this application.

501: Receive parameter information sent by each of at least one routing device.

In this embodiment, in an IGP routing domain, an IGP protocol is run between routing devices, and an information obtaining device establishes a monitoring session with the routing device to monitor a state of the routing device in real time. The IGP protocol is run between routing devices in a monitoring area, and a monitored routing device reports parameter information of the monitored routing device to the information obtaining device. The parameter information includes one or more of protocol packet information, count information, and identity identification information of any routing device, and reporting frequencies are different based on different parameter information. The protocol packet information may be reported in real time, and the count information may be reported based on a preset period. The preset period is set by a network administrator or monitoring personnel based on a performance state of the routing device and a performance state of the information obtaining device. The identity identification information is reported when the information obtaining device establishes the monitoring session with the routing device and when the identity identification information changes subsequently.

In a case of route flapping, the parameter information of the routing device is reported to the information obtaining device. If the parameter information is reported through an in-band path, an SR-TE path may be deployed to avoid impact of the route flapping on information reporting. Alternatively, the parameter information is directly reported through an out-of-band path.

The protocol packet information may include a hello packet and/or an LSP packet of the routing device. The identity identification information may be a system identifier (system ID) of the routing device. The count information includes one or more of a quantity of interface flipping times of the routing device, count data of hello packets received by the routing device from a neighboring routing device, count data of hello packets sent by the routing device to the neighboring routing device, count data of LSP packets received by the routing device from the neighboring routing device, count data of LSP packets sent by the routing device to the neighboring routing device, count data of LSP purge packets initiated by the routing device, and count data of LSP purge packets not initiated by the routing device. That the count data of the LSP purge packets initiated by the routing device indicates that the routing device is a source that generates the LSP purge packet. It should be noted that the foregoing is merely an example, and the parameter information may further include other data. This is not limited herein.

In this embodiment, the information obtaining device receives the parameter information sent by the routing device in the following manners, which are described in the following.

1. Receive, over an extended monitoring protocol of a border gateway protocol (BGP monitoring protocol, BMP), the parameter information sent by the at least one routing device.

The routing device reports the parameter information to the information obtaining device after encapsulating the parameter information based on a BMP format. The information obtaining device obtains the parameter information according to an extended BMP protocol.

A BMP is a monitoring protocol of a BGP. The extended BMP indicates that a message type of an original BMP protocol is extended, and the routing device may report the parameter information to the information obtaining device with an extended BMP message.

The BMP protocol in this application extends five new message types: Type 1: a network monitoring protocol (NMP) initiation message. Type 2: an NMP adjacency status change notification message. Type 3: an NMP statistic report message. Type 4: an NMP IS-IS protocol data unit (PDU) monitoring (monitoring) message. Type 5: an NMP termination message. A specific message type number is allocated by the internet assigned numbers authority (IANA). Among the extended message types of the BMP, message types except for an NMP initiation message type and an NMP termination message type include a BMP common header, a BMP extended per-adjacency header, and a type length value (TLV) format. The NMP initiation message and the NMP termination message include the BMP common header and the TLV format.

The BMP common header reuses an existing common header format defined by the BMP. A message type that can be defined includes seven original messages, and also includes the five new messages in this application. A definition format of the BMP extended per-adjacency header have a plurality of implementations. The BMP extended per-adjacency header needs to include a circuit type of adjacency, identity identification of a neighboring routing device of the adjacency, an area ID of the neighboring routing device of the adjacency, and a timestamp.

2. Receive, over a network monitoring protocol, the parameter information sent by the at least one routing device.

The routing device reports the parameter information to the information obtaining device after encapsulating the parameter information based on a format corresponding to a predefined network monitoring protocol. The information obtaining device obtains the parameter information over the network monitoring protocol.

The defined network monitoring protocol is jointly determined by the routing device and the information obtaining device. The network monitoring protocol may be used to monitor an IGP, and is used for information interaction between the routing device and the information obtaining device, for example, parameter information reporting.

The network monitoring protocol in this application defines five message types: type 0 to type 4, which are sequentially separately used to report the identity identification information of the routing device, establishment and disconnection messages of the adjacency of the routing device, the count information, encapsulated protocol packet information, and prompt information reported by the routing device after the routing device actively disconnects from the information obtaining device.

Type 1 to type 3 include a network monitoring protocol common header, a network monitoring protocol per-adjacency header, and the TLV format. Type 0 and type 4 include the network monitoring protocol common header and the TLV format.

Figure 5B:
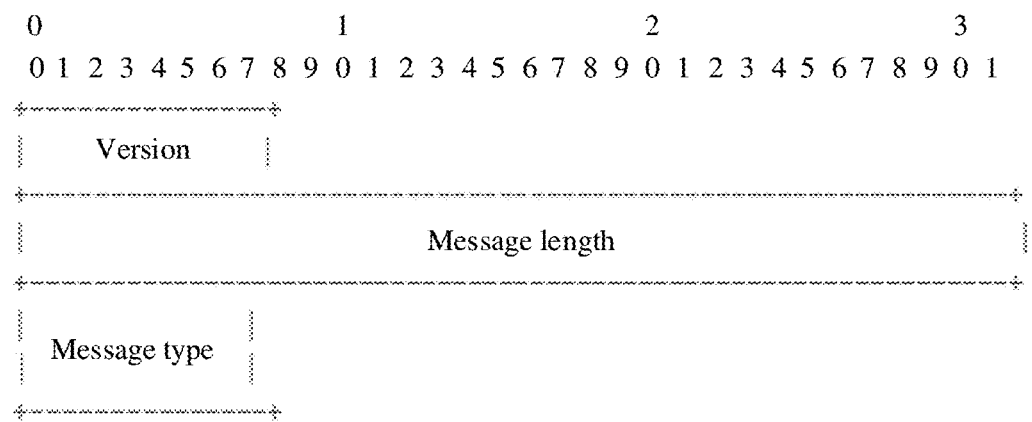

A format of a common header is shown in FIG. 5(b). A version field defines a version number of the network monitoring protocol, a message length field defines a length of a message, and a message type field defines a type of the message. Types of messages that may be defined include the five new messages in this application. A definition format of the network monitoring protocol per-adjacency header is similar to the definition format of the foregoing BMP extended per-adjacency header.

3. Receive, over a Netconf protocol or an open source remote procedure call gRPC protocol, a YANG model sent by the at least one routing device.

After encapsulating the parameter information based on a format of the YANG model, the routing device reports the parameter information to the information obtaining device over the Netconf protocol or the gRPC protocol, and the information obtaining device receives the parameter information. The parameter information in this application may be encapsulated into one or more YANG models.

502: Determine route flapping information of a target routing device based on the parameter information sent by each of the at least one routing device.

In this embodiment, the target routing device is one of the at least one routing device, and the route flapping information includes a flapping source and a flapping cause.

In this embodiment, there are several possible cases in which the route flapping information of the target routing device is determined based on the parameter information sent by each routing device. 1. After each routing device (including the target routing device) reports the parameter information, if the parameter information reported by the target routing device is abnormal, the information obtaining device determines the route flapping information based on the parameter information reported by the target routing device, where the flapping source in the route flapping information may be the target routing device, may be a neighboring routing device of the target routing device, or may be another case, which is not limited herein. 2. After each routing device (including the target routing device) reports the parameter information, if parameter information reported by a neighboring routing device of the target routing device is abnormal, the information obtaining device determines the route flapping information of the target routing device based on the parameter information reported by the neighboring routing device, where the flapping source in the route flapping information may be the neighboring routing device, may be the target routing device, or may be another case, which is not limited herein.

In this embodiment, after establishing a connection with the routing device, the information obtaining device monitors in real time whether the routing device is in a route flapping state. A specific monitoring manner is to receive the parameter information sent by the at least one routing device in a monitoring area, and determine the route flapping information based on the parameter information without isolating the routing device and then logging in the routing device to view the route flapping information. This greatly improves efficiency of determining of route flapping information of a faulty routing device.

Based on the embodiment corresponding to FIG. 5(a), referring to FIG. 6(a)-1, FIG. 6(a)-2, and FIG. 6(a)-3, the following describes a specific process in which the information obtaining device determines the route flapping information based on the parameter information.

First, the target routing device is a routing device in the at least one routing device that reports an abnormal parameter. The information obtaining device may determine and obtain the route flapping information of the target routing device based on the parameter information reported by the target routing device.

A. In a possible case, the parameter information is the identity identification information. When identity identification information of at least two first routing devices is the same, a first routing device is the target routing device. The information obtaining device determines that the flapping cause is a conflict of the identity identification information of the routing devices, and that the flapping source is the at least two first routing devices. For example, if a system identifier (system ID) of a routing device R1 and a system identifier of a routing device R2 are the same, route flapping occurs. Therefore, the information obtaining device can determine, based on the conflicting system identifiers (system IDs), that the flapping source is R1 and R2, and that the flapping cause is a conflict of the system identifiers (system IDs) of the routing device.

B. In another possible case, the parameter information is the quantity of interface flipping times of the routing device. When a quantity of interface flipping times of a second routing device falls within a first preset quantity range of times, the second routing device is the target routing device. The flapping cause is that the quantity of interface flipping times of the routing device is abnormal, and the flapping source is the second routing device. The preset quantity range of times is a data range in which the quantity of interface flipping times is abnormal.

C. In another possible case, the parameter information is count data of hello packets of the routing device. When count data of hello packets received by a third routing device from a first neighboring routing device is intermittently not increased, to be specific, the count data of the hello packets is less than a preset value at intervals, the third routing device is the target routing device. In addition, the information obtaining device determines that the flapping cause is neighbor flapping, and determines that the flapping source is the third routing device, the first neighboring routing device of the third routing device, and/or a link between the third routing device and the first neighboring routing device of the third routing device.

After determining that the flapping cause is the neighbor flapping, the information obtaining device may further determine the flapping source based on the parameter information, and analyze a specific type of the generated neighbor flapping.

c1. Check whether the flapping source is the third routing device or the first neighboring routing device based on a quantity of interface flapping times.

The parameter information further includes a quantity of interface flipping times of the third routing device and a quantity of interface flipping times of the first neighboring routing device. That the information obtaining device determines that the flapping cause is neighbor flapping specifically includes: detecting whether the quantity of interface flipping times of the third routing device or the quantity of interface flipping times of the first neighboring routing device is within a second preset quantity range of times. The second preset quantity range of times is a range of abnormal counting data, and the second preset quantity range of times and the first preset quantity range of times may be a same quantity range of times.

If the quantity of interface flipping times of the third routing device is within the second preset quantity range of times, the flapping source is the third routing device. If the quantity of interface flipping times of the first neighboring routing device is within the second preset quantity range of times, the flapping source is the first neighboring routing device of the third routing device. The flapping cause is that the quantity of interface flapping times is abnormal.

When the case described in c1 is not met, to be specific, the quantity of interface flipping times of the third routing device or the quantity of interface flipping times of the first neighboring routing device is not within the second preset quantity range of times, it is further required to analyze whether the flapping source is the third routing device or the first neighboring routing device with reference to the count data of the hello packets.

c2. Check whether the flapping source is the third routing device. Specific steps are: obtaining count data of hello packets received by the third routing device from one or more second neighboring routing devices, determining whether the count data is less than the preset value in C, and if yes, determining that the flapping cause is that receiving of a hello packet of the third routing device times out, and that the flapping source is the third routing device. A specific root cause may be that an interface board of the third routing device is faulty, a local distribution module (LDM) of the third routing device is faulty, a socket module of the third routing device is faulty, and/or CPU usage of the third routing device is excessively high. The second neighboring routing device and the first neighboring routing device are different neighboring routing devices of the third routing device.

c3. Check whether the flapping source is the first neighboring routing device. When the case described in c2 is not met, to be specific, count data of hello packets received by the third routing device from another neighboring routing device other than the first neighboring routing device is normal, the information obtaining device further analyzes whether count data of hello packets sent by the first neighboring routing device to another neighboring device other than the third routing device is less than the preset value in C, and if yes, determines that the flapping cause is that sending of a hello packet of the first neighboring routing device times out. The flapping source is the first neighboring routing device, and a possible cause is that a sending module of the first neighboring routing device is faulty, which is specifically as follows. An interface board is faulty, a LDM is faulty, a socket module is faulty, or CPU usage is excessively high.

Figures 1, 6A:
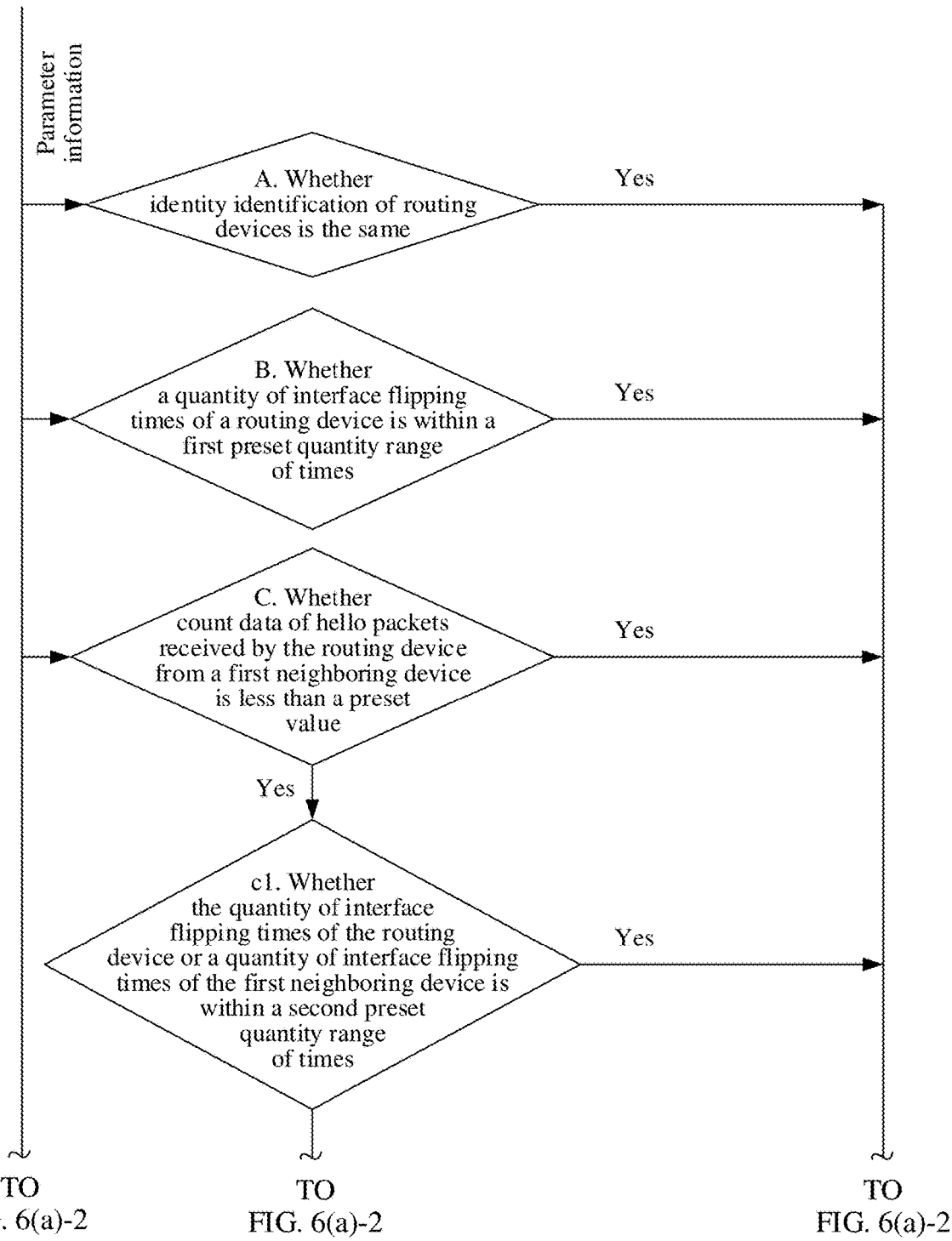
Figures 2, 6A:
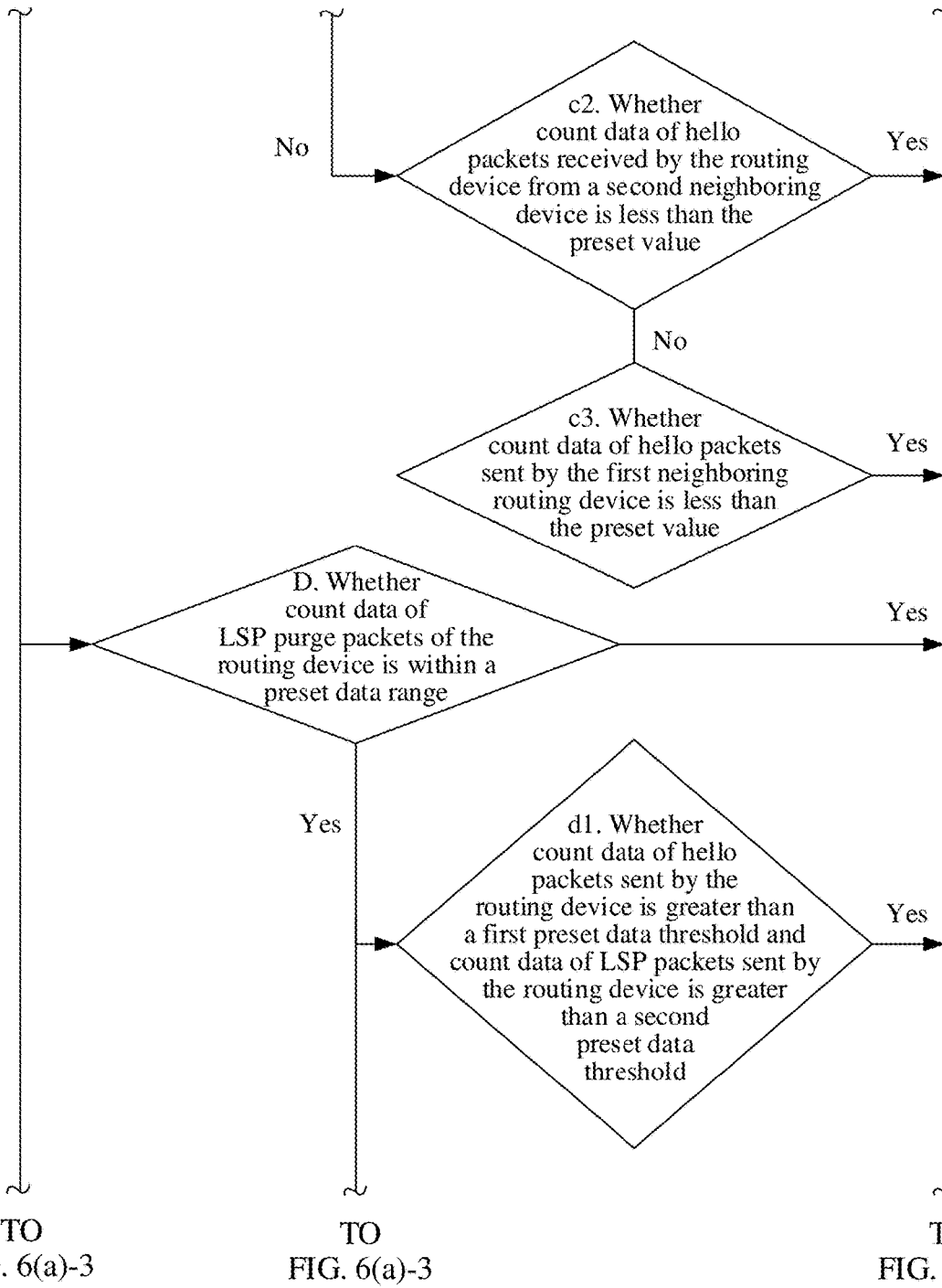
Figures 3, 6A:
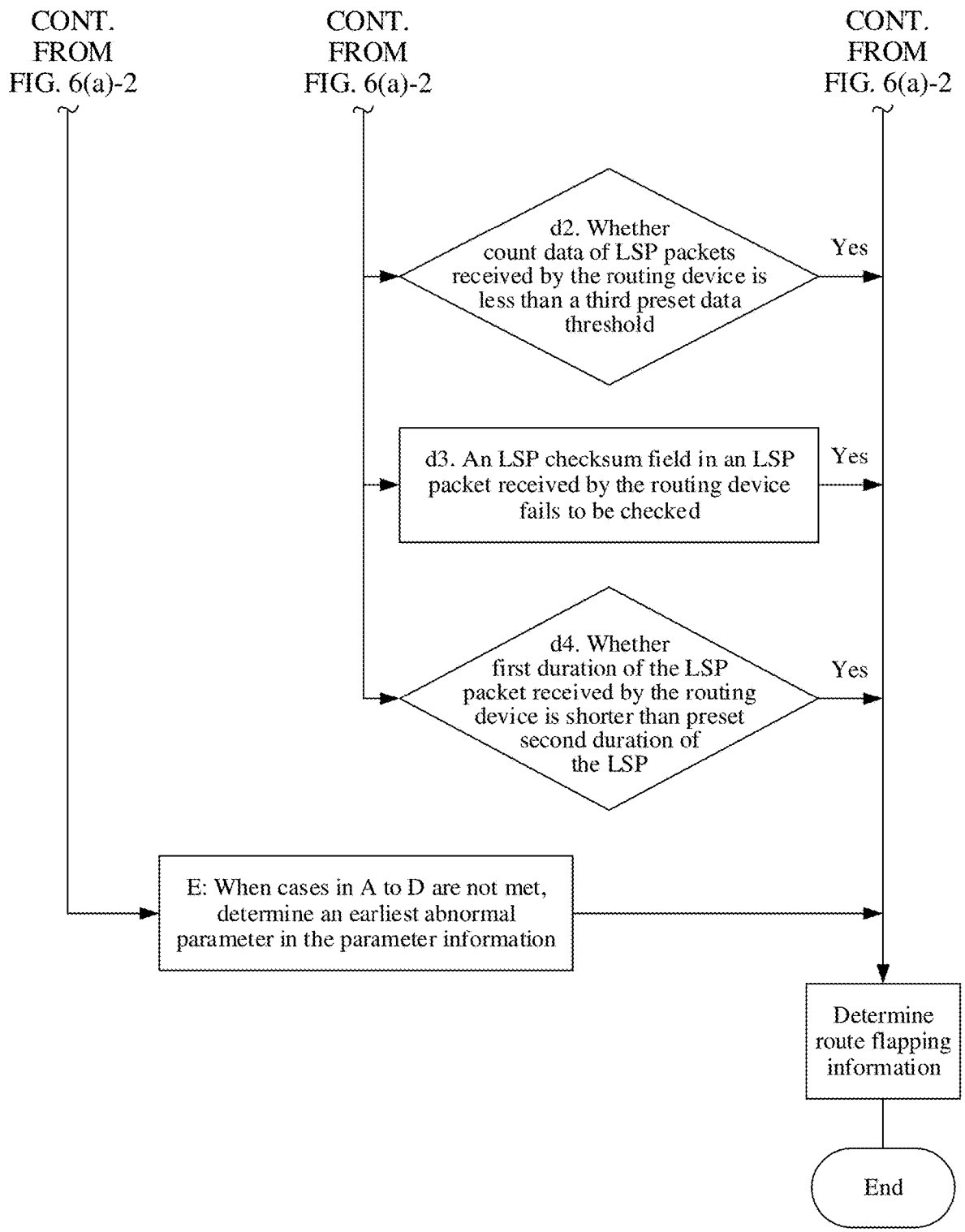
Figure 6B:
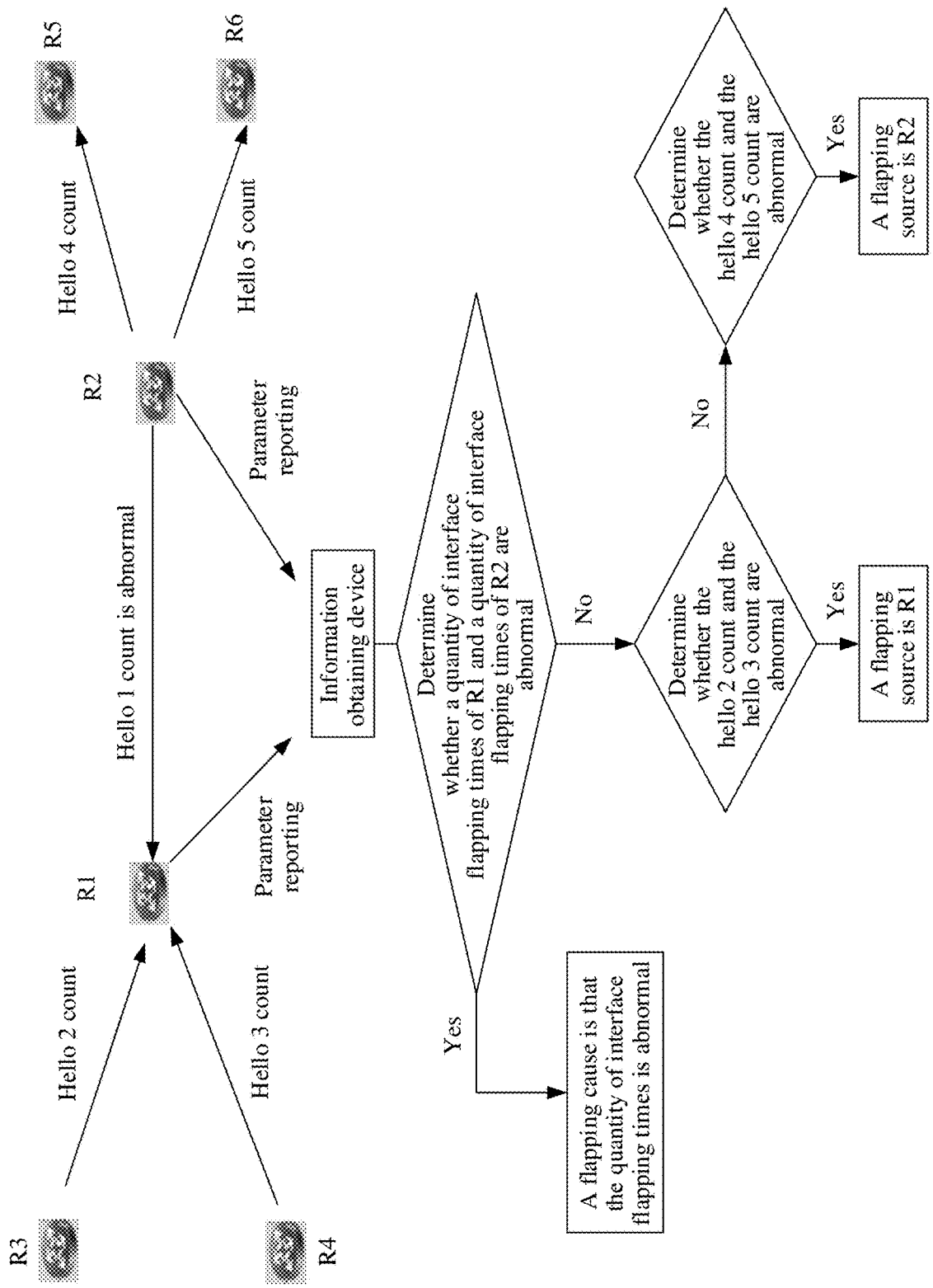
FIG. 6(*a*)-1, FIG. 6(*a*)-2, and FIG. 6(*a*)-3 are a schematic diagram of another embodiment of a method for determining route flapping information according to this application.

FIG. 6(b) is used as an example to describe the foregoing case. When count data of hello packets received by a router R1 from a neighboring router R2 is abnormal, one of R1 and R2 needs to be the flapping source. The information obtaining device first determines whether a quantity of interface flapping times of R1 and a quantity of interface flapping times of R2 are abnormal. If the quantity of interface flapping times of R1 is abnormal, the flapping source is R1. If the quantity of interface flapping times of R2 is abnormal, the flapping source is R2. Flapping causes are that quantities of interface flapping times are abnormal. If not, the information obtaining device determines, based on the count data of the hello packets received by R1 from neighboring routers R3 and R4 other than R2, whether the count data of the hello packets received by R1 from R3 and R4 is abnormal. If yes, the flapping source is R1, and the flapping cause is that receiving of a hello packet times out. If the count data of the hello packets received by R1 from R3 and R4 is normal, the information obtaining device determines whether count data of hello packets sent by R2 to neighboring routers R5 and R6 is normal. If yes, the flapping source is R2, and the flapping cause is that sending of a hello packet times out.

D. Another possible case is that the parameter information includes count data of link state packet LSP purge packets initiated by the routing device.

When data count of LSP purge packets of a fourth routing device is within a preset data range, the fourth routing device is the target routing device. The information obtaining device determines that the flapping cause is that the LSP purge packets of the routing device are abnormal, and determines that the flapping source is the fourth routing device and/or a neighboring routing device of the fourth routing device. The preset data range is a data range of abnormal data.

After determining that the flapping cause is that the LSP purge packets are abnormal, the information obtaining device may further analyze a cause of abnormality of the LSP purge packets based on the parameter information.

d1. The parameter information further includes count data of hello packets sent by the fourth routing device and count data of LSP packets sent by the fourth routing device.

That the information obtaining device determines that the flapping cause is that the LSP purge packets are abnormal specifically includes:

if the count data of the hello packets sent by the fourth routing device is greater than a first preset data threshold, and the count data of the LSP packets is greater than a second preset data threshold, determining that the flapping cause is that a clock frequency of the routing device is abnormal, and that the flapping source is the fourth routing device.

d2. The parameter information further includes count data of LSP packets received by the fourth routing device.

That the information obtaining device determines that the flapping cause is that the LSP purge packets are abnormal specifically includes:

if the count data of the LSP packets received by the fourth routing device is less than a third preset data threshold, determining that the flapping cause is that a packet loss occurs on the LSP of the routing device in a receiving process, and that the flapping source is the fourth routing device.

d3. The parameter information further includes an LSP packet received by the fourth routing device, where the LSP packet includes an LSP checksum field.

That the information obtaining device determines that the flapping cause is that the LSP purge packets are abnormal specifically includes:

checking, by the information obtaining device, the LSP checksum field, and if a check error occurs, determining that the flapping cause is the LSP checksum check error, and that the flapping source is the fourth routing device.

d4. The parameter information further includes an LSP packet received by the fourth routing device, where the LSP packet includes first duration of the LSP.

That the information obtaining device determines that the flapping cause is that the LSP purge packets are abnormal specifically includes:

determining whether the first duration of the LSP is shorter than preset second duration of the LSP; and if yes, determining, based on the first duration of the LSP, that the flapping cause is that a frequency of the LSP purge packets is abnormal. For example, if an LSP remaining lifetime is much shorter than an LSP refresh interval in a device, it is determined that the flapping cause is that the LSP purge packets are abnormal for the LSP remaining lifetime being excessively short.

Further, it further needs to be determined whether that the first duration of the LSP is excessively small caused by the fourth routing device or the neighboring routing device of the fourth device, in other words, it is determined which device tampers with the first duration of the LSP and causes the first duration to be excessively small. A specific reason why the LSP lifetime is excessively short may be further obtained.

The information obtaining device determines whether first duration of the LSP sent by the neighboring routing device of the fourth routing device is the same as the first duration of the LSP received by the fourth routing device.

If yes, it is proved that the first duration is tampered with on a side of the neighboring routing device, and it is determined that the flapping cause is that the first duration of the LSP is tampered on the side of the neighboring routing device of the fourth routing device, and that the flapping source is the neighboring routing device of the fourth routing device.

If not, it indicates that the first duration is not tampered with on the side of the neighboring routing device, but is tampered with on a side of the fourth routing device or in a transmission process. The information obtaining device determines that the flapping cause is that the first duration of the LSP is tampered with on the side of the fourth device or on a target link. The target link is a link between the fourth routing device and the neighboring routing device of the fourth routing device. The flapping source is the fourth routing device or the target link.

Because when one parameter in the parameter information changes, another parameter usually changes. One or more of the foregoing d1 to d4 may occur at the same time. For example, when d1 is met, d2 is also met at the same time. In addition, there may be no sequence for determining of d1 to d4. After obtaining the parameter information corresponding to d1 to d4, the information obtaining device performs the determining corresponding to d1 to d4. There may also be a sequence for the determining of d1 to d4. The information obtaining device may further determine a next case when one or more cases in d1 to d4 are not met. For example, d2 is performed when d1 is not met. Further, d3 is performed when d2 is not met, and then d4 is performed when d3 is not met. Specific execution steps of d1 to d4 are not limited herein.

In the following example, when count data of LSP purge packets of the router R1 is abnormal and within the preset data range, an optional manner is: The information obtaining device determines whether both count data of hello packets sent by R1 and count data of LSP packets sent by R1 are excessively large. If yes, a clock frequency of R1 is abnormal. Another optional manner is: The information obtaining device determines whether the count data of the LSP packets received by R1 is excessively small. If yes, a packet loss occurs on the LSP of R1 during transmission. Another optional manner is: If an LSP checksum field of the LSP packets received by R1 fails to be checked, the route flapping information causing the route flapping is a field check error of R1. In another optional manner: When a remaining lifetime of the LSP packet received by R1 is less than a refresh interval of the LSP, the information obtaining device further analyzes whether the remaining lifetime is tampered with on an end of R1 or tampered with on an end of the neighboring router R2 of R1, or is tampered with on a link between R1 and R2. If the remaining lifetime sent by R2 to R1 is different from the refresh interval, it indicates that the remaining lifetime is tampered with on the end of R2, and the flapping source is R2. If the remaining lifetime sent by R2 to R1 is the same as the refresh interval, it indicates that the remaining lifetime is tampered with on the end of R1 or on the transmission link between R1 and R2, and the flapping source is R1 or the link between R1 and R2.

In addition, because when one parameter in the parameter information changes, another parameter usually changes. One or more of the foregoing A to D may occur at the same time. For example, when A is met, B is also met at the same time. In addition, there may be no sequence for determining of A to D. After obtaining the parameter information corresponding to A to D, the information obtaining device performs the determining corresponding to d1 to d4, to obtain the route flapping information. There may also be a sequence for the determining of A to D. The information obtaining device may further determine a next case when one or more cases in A to D are not met. For example, B is performed when A is not met. Further, C is performed when B is not met, and then D is performed when C is not met. Specific execution steps of A to D are not limited herein.

E. In another possible case, when cases in A to D are not met, the information obtaining device may determine an earliest abnormal parameter in the parameter information, and the flapping source is a routing device corresponding to the earliest abnormal parameter. In addition, the information obtaining device further analyzes an LSP packet sent by the routing device corresponding to the earliest abnormal parameter. If finding that values of a plurality of LSP seqnum fields in the packet continuously increase and a specific route is intermittent, the information obtaining device determines that the flapping cause is route source flapping caused by the intermittent route.

In this embodiment, the information obtaining device may analyze the parameter information reported by the routing device, determine whether the parameter information is abnormal, and if an abnormal parameter appears, locate the flapping source and the flapping cause based on the abnormal parameter. There is no need to isolate the routing device and then log in to the routing device to view the route flapping information. This greatly improves the efficiency of the determining of the route flapping information of the faulty routing device. In addition, after obtaining the parameter information of the routing device, the information obtaining device performs analysis based on the method in the foregoing embodiment to obtain the route flapping information. This may improve accuracy of the determined route flapping information.

Figures 7, 8:
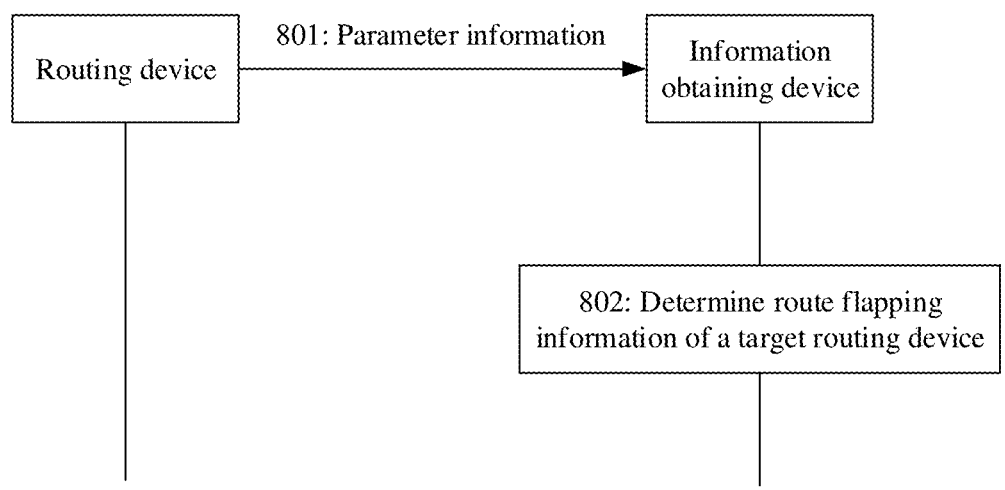
FIG. 7 is a schematic diagram of another embodiment of a method for determining route flapping information according to this application.
FIG. 8 is a schematic diagram of another embodiment of a method for determining route flapping information according to this application.

The foregoing describes this application from a perspective of the information obtaining device. Referring to FIG. 7, the following describes this application from a perspective of a routing device.

701: A routing device sends parameter information to an information obtaining device.

In this embodiment, a possible case of the parameter information is similar to that in the embodiment in FIG. 5(*a*).

In this embodiment, a manner of sending the parameter information is similar to that in the embodiment shown in FIG. 5(*a*). YANG model data of related information may be sent over a network monitoring protocol, may be sent over an extended monitoring protocol of a border gateway protocol BMP, or may be sent over a Netconf protocol or an open source procedure call gRPC protocol.

In this embodiment, after the routing device sends the parameter information to the information obtaining device, the information obtaining device may obtain route flapping information of the routing device. The route flapping information includes a flapping source and a flapping cause, and the flapping source in the route flapping information obtained based on the parameter information of the routing device is not necessarily the routing device. For example, after the routing device reports the parameter information, it is obtained, based on the parameter information, that the flapping source is the routing device. Alternatively, after the routing device reports the parameter information, it is obtained, based on the parameter information, that the flapping source is a neighboring routing device of the routing device. Alternatively, after the routing device reports the parameter information, it is obtained, based on the parameter information, that the flapping source is a link between the routing device and the neighboring routing device of the routing device.

In this embodiment, after the routing device sends the parameter information to the information obtaining device, the information obtaining device determines the route flapping information based on the parameter information without isolating the routing device and then logging in the routing device to view the route flapping information. This greatly improves efficiency of determining of route flapping information of a faulty routing device.

Referring to FIG. 8, the following describes an interaction case between a routing device and an information obtaining device in this application.

801: A routing device sends parameter information to an information obtaining device.

Step 801 in this embodiment is similar to step 701 in the foregoing embodiment, and details are not described herein again.

802: Determine route flapping information of a target routing device based on the parameter information sent by the routing device.

In this embodiment, the target routing device is one of routing devices that report parameter information to the information obtaining device, and the parameter information reported by the target routing device is abnormal parameter information. The information obtaining device may determine and obtain the route flapping information of the target routing device based on the parameter information reported by the target routing device.

Step 802 in this embodiment is similar to step 502 in the foregoing embodiment, and details are not described herein again.

In this embodiment, the information obtaining device may analyze the parameter information reported by the routing device, determine whether the parameter information is abnormal, and if an abnormal parameter appears, locate a flapping source and a flapping cause based on the abnormal parameter. There is no need to isolate the routing device and then log in to the routing device to view route flapping information. This greatly improves efficiency of determining of route flapping information of a faulty routing device.

This application may be applied to route flapping locating for an ISIS protocol, or may be applied to route flapping locating for an OSPF protocol. When this application is applied to the OSPF protocol, an LSP in the ISIS protocol is corresponding to an LSA in the OSPF, and a system ID in the ISIS protocol is corresponding to a router ID in the OSPF. A specific manner of determining route flapping information in the route flapping locating for the ISIS protocol is similar to that of the route flapping locating for the OSPF protocol, and details are not described herein.

Figure 9:
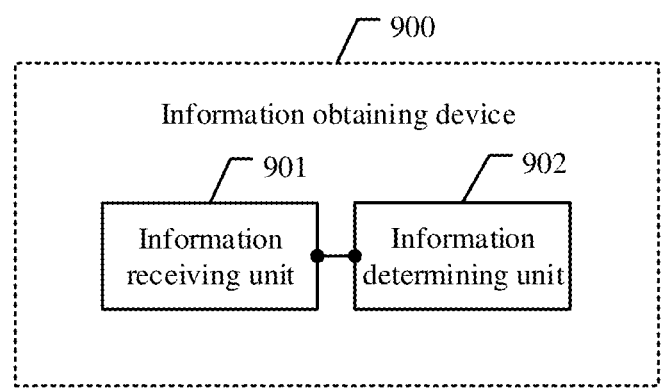
FIG. 9 shows another possible structure of an information obtaining device according to this application.

Referring to FIG. 9, another possible structure of an information obtaining device 900 in this application is as follows, including:

an information receiving unit 901, configured to receive parameter information sent by each of at least one routing device, where parameter information sent by any routing device includes at least one of protocol packet information, count information, and identity identification information of the any routing device; and an information determining unit 902, configured to determine route flapping information of a target routing device based on the parameter information sent by each of the at least one routing device, where the target routing device is one of the at least one routing device.

Optionally, the information receiving unit 901 is specifically configured to receive, over a network monitoring protocol, the parameter information sent by each of the at least one routing device. The network monitoring protocol is a monitoring protocol of an IGP.

Optionally, the information receiving unit 901 is specifically configured to receive, over an extended monitoring protocol of a border gateway protocol BMP, the parameter information sent by each of the at least one routing device. The BMP protocol is a monitoring protocol of a BGP.

Optionally, the information receiving unit 901 is specifically configured to receive, over a Netconf protocol or an open source remote procedure call gRPC protocol, a YANG model sent by each of the at least one routing device. The parameter information is encapsulated in the YANG model.

Optionally, the information determining unit 902 is specifically configured to: when the identity identification information of at least two first routing devices is the same, determine that a flapping cause is a conflict of the identity identification information of the routing devices, where the at least one routing device includes the at least two first routing devices; and determine that a flapping source is the at least two first routing devices.

Optionally, the count information includes a quantity of interface flipping times of the routing device.

The information determining unit 902 is specifically configured to: when a quantity of interface flipping times of a second routing device is within a preset quantity range of times, determine that a flapping cause is that the quantity of interface flipping times of the routing device is abnormal, where the at least one routing device includes the second routing device; and determine that a flapping source is the second routing device.

Optionally, the count information includes count data of hello packets of the routing device.

The information determining unit 902 is specifically configured to: determine, based on count data, of hello packets, that is sent by a third routing device and that is less than a preset value, that a flapping cause is neighbor flapping, where the at least one routing device includes the third routing device; and determine that a flapping source is the third routing device, a neighboring routing device of the third routing device, or a link between the third routing device and the neighboring routing device of the third routing device.

Optionally, the count information includes count data of link state packet LSP purge packets of the routing device.

The information determining unit 902 is specifically configured to: determine, based on count data that is within a preset data range and that is of LSP purge packets sent by a fourth routing device, that a flapping cause is that LSP purge packets of the routing device are abnormal, where the at least one routing device includes the fourth routing device; and determine that a flapping source is the fourth routing device or a neighboring routing device of the fourth routing device.

Optionally, the information determining unit is specifically configured to: determine a target parameter in the parameter information sent by each of the at least one routing device, where the target parameter is an earliest abnormal parameter; and determine that a flapping source is a routing device corresponding to the target parameter.

Figure 10:
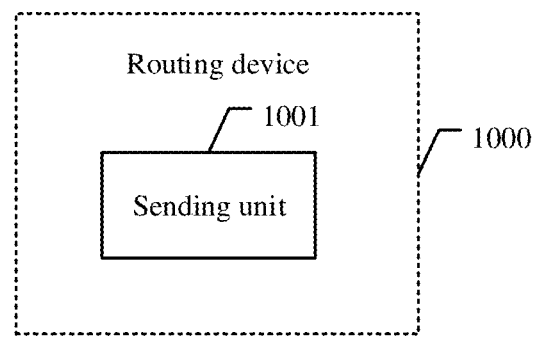
FIG. 10 shows another possible structure of a routing device according to this application.

Referring to FIG. 10, a possible structure of a routing device 1000 in this application is as follows, including:

a sending unit 1001, configured to send parameter information to an information obtaining device. The parameter information sent by the routing device includes at least one of protocol packet information, count information, and identity identification information of the routing device. The parameter information sent by the routing device is used by the information obtaining device to determine route flapping information of the routing device.

Optionally, the sending unit 1001 is specifically configured to send the parameter information to the information obtaining device over a network monitoring protocol. The network monitoring protocol is a monitoring protocol of an IGP.

Optionally, the sending unit 1001 is specifically configured to send the parameter information to the information obtaining device over an extended monitoring protocol of a border gateway protocol BMP. The BMP protocol is a monitoring protocol of a BGP.

Optionally, the sending unit 1001 is specifically configured to send a YANG model to the information obtaining device over a Netconf protocol or an open source remote procedure call gRPC protocol. The parameter information is encapsulated in the YANG model.

In addition, it should be noted that the apparatus embodiments are merely examples. The modules described as separate parts may or may not be physically separate, and modules displayed as units may or may not be physical units, may be located in one position, or may be distributed on a plurality of network units. Some or all of the modules may be selected based on actual requirements to achieve the objectives of the solutions of the embodiments. In addition, in the accompanying drawings of the apparatus embodiments provided in this application, connection relationships between modules indicate that the modules have communication connections with each other, which may be specifically implemented as one or more communications buses or signal cables.

Based on the description of the foregoing implementations, a person skilled in the art may clearly understand that this application may be implemented by software in addition to necessary universal hardware, or by special-purpose hardware, including a dedicated integrated circuit, a dedicated CPU, a dedicated memory, a dedicated component, and the like. Generally, any functions that can be performed by a computer program can be easily implemented by corresponding hardware. Moreover, a specific hardware structure used to achieve a same function may be of various forms, for example, in a form of an analog circuit, a digital circuit, a dedicated circuit. Based on such an understanding, the technical solutions of this application essentially or the part contributing to the prior art may be implemented in a form of a software product. The computer software product is stored in a readable storage medium, such as a floppy disk, a USB flash drive, a removable hard disk, a read-only memory (ROM), a random access memory (RAM), a magnetic disk, or a compact disc of a computer, and includes several instructions for instructing a computer device (which may be a personal computer, a server, a network device, or the like) to perform the methods described in the embodiments of this application.

The computer program product includes one or more computer instructions. When the computer program instructions are loaded and executed on a computer or a processor of the computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium that the computer can store, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

What is claimed is:

1. An information obtaining device, comprising:
   a transceiver;
   a memory storing instructions; and
   a processor,
   wherein the transceiver is configured to receive parameter information sent by each of at least one routing device, wherein parameter information sent by any routing device in the at least one routing device comprises protocol packet information, count information, and identity identification information of the any routing device, and wherein the protocol packet information, the count information, and the identity identification information are sent at respectively different reporting frequencies; and
   wherein the processor is configured to execute the instructions to cause the information obtaining device to
   determine route flapping information of a target routing device based on some or all of the parameter information sent by each of the at least one routing device, wherein the target routing device is one of the at least one routing device,
   wherein the count information comprises count data of received hello packets of a neighboring routing device; and
   wherein the processor is further configured to execute the instructions to cause the information obtaining device to:
   receive the count data of received hello packets from a third routing device, wherein the count data comprises a number of hello packets received by the third routing device in a time interval, and wherein the at least one routing device comprises the third routing device;
   determine, based on the count data of received hello packets from the third routing device and that is less than a preset value, that a flapping cause is neighbor flapping; and
   determine that a flapping source is the third routing device, the neighboring routing device of the third routing device, or a link between the third routing device and the neighboring routing device of the third routing device.

2. The information obtaining device according to claim 1, wherein the transceiver is further configured to
   receive, over a network monitoring protocol, the parameter information sent by each of the at least one routing device, wherein the network monitoring protocol is a monitoring protocol of an interior gateway protocol (IGP).

3. The information obtaining device according to claim 1, wherein the transceiver is further configured to
   receive, over an extended monitoring protocol of a border gateway protocol (BMP), the parameter information sent by each of the at least one routing device, wherein the BMP protocol is a monitoring protocol of a border gateway protocol (BGP).

4. The information obtaining unit according to claim 1, wherein the transceiver is further configured to
   receive, over a Netconf protocol or an open source remote procedure call gRPC protocol, a YANG model sent by each of the at least one routing device, wherein the parameter information is encapsulated in the YANG model.

5. The information obtaining device according to claim 1, wherein the processor is further configured to execute the instructions to cause the information obtaining device to:
   determine that a flapping cause is a conflict of the identity identification information of the routing devices when the identity identification information of at least two first routing devices is the same, wherein the at least one routing device comprises the at least two first routing devices; and determine that a flapping source is the at least two first routing devices.

6. The information obtaining device according to claim 1, wherein the count information comprises a quantity of interface flipping times of the routing device; and wherein the processor is further configured to execute the instructions to cause the information obtaining device to:

determine that a flapping cause is that the quantity of interface flipping times of the routing device is abnormal when a quantity of interface flipping times of a second routing device is within a preset quantity range of times, wherein the at least one routing device comprises the second routing device; and determine that a flapping source is the second routing device.

7. The information obtaining device according to claim 1, wherein the count information comprises count data of link state packet (LSP) purge packets of the routing device; and wherein the processor is further configured to execute the instructions to cause the information obtaining device to:

determine, based on count data that is within a preset data range and that is of LSP purge packets sent by a fourth routing device, that a flapping cause is that the LSP purge packets of the routing device are abnormal, wherein the at least one routing device comprises the fourth routing device; and determine that a flapping source is the fourth routing device or a neighboring routing device of the fourth routing device.

8. The information obtaining device according to claim 1, wherein the processor is further configured to execute the instructions to cause the information obtaining device to:

determine a target parameter in the parameter information sent by each of the at least one routing device, wherein the target parameter is an earliest abnormal parameter; and determine that a flapping source is a routing device corresponding to the target parameter.

9. A method for determining route flapping information, comprising:

sending, by a routing device, parameter information to an information obtaining device, wherein the parameter information sent by the routing device comprises protocol packet information, count information, and identity identification information of the routing device, wherein the protocol packet information, the count information, and the identity identification information are sent at respectively different reporting frequencies, and some or all of the parameter information sent by the routing device is used by the information obtaining device to determine route flapping information of the routing device, wherein the count information comprises count data of received hello packets of a neighboring routing device; and wherein the processor is further configured to execute the instructions to cause the information obtaining device to:

receive the count data of received hello packets from a third routing device, wherein the count data comprises a number of hello packets received by the third routing device in the second time interval, and wherein the at least one routing, device comprises the third muting device;

determine, based on the count data, of received hello packets from the third routing device and that is less than a preset value, that a flapping cause is neighbor flapping;

and determine that a flapping source is the third routing device, the neighboring routing device of the third routing device, or a link between the third routing device and the neighboring routing device of the third routing device.

10. The method according to claim 9, wherein the sending, by a routing device, parameter information to an information obtaining device comprises sending, by the routing device, the parameter information to the information obtaining device over a network monitoring protocol, wherein the network monitoring protocol is a monitoring protocol of an interior gateway protocol (IGP).

11. The method according to claim 9, wherein the sending, by a routing device, parameter information to an information obtaining device comprises sending, by the routing device, the parameter information to the information obtaining device over an extended monitoring protocol of a border gateway protocol (BMP), wherein the BMP protocol is a monitoring protocol of a border gateway protocol (BGP).

12. The method according to claim 9, wherein the sending, by a routing device, parameter information to an information obtaining device comprises sending, by the routing device, a YANG model to the information obtaining device over a Netconf protocol or an open source remote procedure call gRPC protocol, wherein the parameter information is encapsulated in the YANG model.

13. A routing device, comprising:

a transceiver;

a memory storing instructions; and a processor, wherein the transceiver is configured to send parameter information to an information obtaining device, wherein the parameter information sent by the routing device comprises protocol packet information, count information, and identity identification information of the routing device, wherein the protocol packet information, the count information, and the identity identification information are sent at respectively different reporting frequencies, and some or all of the parameter information sent by the routing device is used by the information obtaining device to determine route flapping information of the routing device, wherein the count information comprises count data of received hello packets of a neighboring routing device; and wherein the processor is further configured to execute the instructions to cause the information obtaining device to:

receive the count data of received hello packets from a third routing device, wherein the count data comprises a number of hello packets received by the third routing device in a time interval, and wherein the at least one routing device comprises the third routing device;

determine, based on the count data of received hello packets from the third routing device and that is less than a preset value, that a flapping cause is neighbor flapping; and determine that a flapping source is the third routing device, the neighboring routing device of the third routing device, or a link between the third routing device and the neighboring routing device of the third routing device.

14. The routing device according to claim 13, wherein the transceiver is further configured to send the parameter information to the information obtaining device over a network monitoring protocol, wherein the network monitoring protocol is a monitoring protocol of an interior gateway protocol (IGP).

15. The routing device according to claim 13, wherein the transceiver is further configured to send the parameter information to the information obtaining device over an extended monitoring protocol of a border gateway protocol (BMP), wherein the BMP protocol is a monitoring protocol of a border gateway protocol (BGP).

16. The routing device according to claim 13, wherein the transceiver is further configured to send a YANG model to the information obtaining device over a Netconf protocol or an open source remote procedure call gRPC protocol, wherein the parameter information is encapsulated in the YANG model.

17. An information obtaining device, comprising:
a transceiver;
a memory storing instructions; and
a processor,
wherein the transceiver is configured to receive parameter information sent by each of at least one routing device, wherein parameter information sent by any routing device in the at least one routing device comprises protocol packet information, count information, and identity identification information of the any routing device, and wherein the protocol packet information, the count information, and the identity identification information are sent at respectively different reporting frequencies; and wherein the processor is configured to execute the instructions to cause the information obtaining device to
determine route flapping information of a target routing device based on some or all of the parameter information sent by each of the at least one routing device, wherein the target routing device is one of the at least one routing device,
wherein the count information, includes respective counts of routing protocol packets received by the target routing device from a neighbor routing device for each of one or more types of routing protocol packet types, respective counts of routing protocol packets received by the neighbor routing device from the target routing device for each of the one or more types of routing protocol packet types, a quantity of interface flipping times of the target routing device, a quantity of interface flipping times of the neighbor routing device, and respective counts of routing protocol packets received by the target routing device from a second neighbor routing device for each of the one or more types of routing protocol packet types; and
wherein the processor is further configured to execute the instructions to cause the information obtaining device to
determine a flapping source and a flapping cause of a route flapping associated with the target routing device based on the respective counts of routing protocol packets received by the target routing device from a neighbor routing device, the respective counts of routing protocol packets received by the neighbor routing device from the target routing device, the quantity of interface flipping times of the target routing device, the quantity of interface flipping times of the neighbor routing device, and the respective counts of routing protocol packets received by the target routing device from a second neighbor routing device for each of the one or more types of routing protocol packet types.

* * * * *

UNITED STATES PATENT AND TRADEMARK OFFICE
CERTIFICATE OF CORRECTION

| | |
|---|---|
| PATENT NO. | : 11,489,759 B2 |
| APPLICATION NO. | : 17/205167 |
| DATED | : November 1, 2022 |
| INVENTOR(S) | : Yunan Gu et al. |

It is certified that error appears in the above-identified patent and that said Letters Patent is hereby corrected as shown below:

In the Claims

- Claim 9, at Column 26, Line 2, replace "muting" with "routing".

Signed and Sealed this
Twentieth Day of December, 2022

*Katherine Kelly Vidal*

Katherine Kelly Vidal
*Director of the United States Patent and Trademark Office*